United States Patent
Oikawa

(10) Patent No.: US 8,825,291 B2
(45) Date of Patent: Sep. 2, 2014

(54) VEHICLE VIBRATION-DAMPING CONTROLLING APPARATUS

(75) Inventor: Yoshitaka Oikawa, Susono (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 0 days.

(21) Appl. No.: 13/123,842

(22) PCT Filed: Oct. 5, 2009

(86) PCT No.: PCT/JP2009/005149
§ 371 (c)(1),
(2), (4) Date: Apr. 12, 2011

(87) PCT Pub. No.: WO2011/042928
PCT Pub. Date: Apr. 14, 2011

(65) Prior Publication Data
US 2012/0265400 A1    Oct. 18, 2012

(51) Int. Cl.
| | |
|---|---|
| G06F 19/00 | (2011.01) |
| G06F 17/00 | (2006.01) |
| F02D 41/02 | (2006.01) |
| B60W 10/06 | (2006.01) |
| F02D 29/02 | (2006.01) |
| B60W 30/20 | (2006.01) |
| B60W 10/22 | (2006.01) |
| F02D 11/10 | (2006.01) |
| B60W 10/08 | (2006.01) |
| B60K 6/445 | (2007.10) |
| B60W 20/00 | (2006.01) |

(52) U.S. Cl.
CPC ............. *B60K 6/445* (2013.01); *F02D 41/021* (2013.01); *B60W 10/06* (2013.01); *B60W 2720/16* (2013.01); *F02D 29/02* (2013.01); *Y02T 10/6239* (2013.01); *F02D 2250/18* (2013.01); *B60W 30/20* (2013.01); *B60W 2030/206* (2013.01); *B60W 10/22* (2013.01); *Y02T 10/6286* (2013.01); *F02D 11/105* (2013.01); *B60W 10/08* (2013.01); *B60W 20/00* (2013.01)

USPC ............................................... 701/37; 701/48

(58) Field of Classification Search
CPC ............... B60W 30/02; B60W 30/18; B60W 30/18181; B60W 30/188; B60W 40/10; B60W 40/11
USPC .......................................... 701/29, 34, 37, 48
See application file for complete search history.

(56) References Cited

U.S. PATENT DOCUMENTS

| | | | |
|---|---|---|---|
| 6,621,244 B1 * | 9/2003 | Kiyomiya et al. | ............ 318/611 |
| 2005/0049761 A1 | 3/2005 | Kataoka et al. | |

(Continued)

FOREIGN PATENT DOCUMENTS

| | | |
|---|---|---|
| EP | 1 978 279 A2 | 10/2008 |
| JP | 2001-065402 | * 3/2001 |

(Continued)

OTHER PUBLICATIONS

Machine Translation: JP 2008-231989.*

(Continued)

*Primary Examiner* — Fadey Jabr
*Assistant Examiner* — Aaron L Troost
(74) *Attorney, Agent, or Firm* — Oliff PLC

(57) ABSTRACT

In a vehicle vibration-damping controlling apparatus for executing vibration-damping control to control a power source loaded on a vehicle to suppress sprung vibration of the vehicle, a control amount of the vibration-damping control is changed based on a judgment target amount that is used in judging control and variable accompanied by an execution of the vibration-damping control. Therefore, since the control amount of the vibration-damping control is changed based on the judgment target amount, it is possible to allow the vibration-damping control to coordinate with various pieces of judging control related to the power source and appropriately execute the vibration-damping control.

10 Claims, 6 Drawing Sheets

(56) References Cited

U.S. PATENT DOCUMENTS

| | | |
|---|---|---|
| 2006/0052908 A1 | 3/2006 | Matsumoto et al. |
| 2007/0004553 A1 | 1/2007 | Oikawa et al. |
| 2009/0071736 A1 | 3/2009 | Mori et al. |
| 2010/0228465 A1 | 9/2010 | Itabashi |
| 2010/0241305 A1* | 9/2010 | Itabashi et al. ............... 701/34 |

FOREIGN PATENT DOCUMENTS

| | | | |
|---|---|---|---|
| JP | A-2001-65402 | | 3/2001 |
| JP | A-2004-168148 | | 6/2004 |
| JP | A-2006-69472 | | 3/2006 |
| JP | A-2007-8422 | | 1/2007 |
| JP | A-2007-161032 | | 6/2007 |
| JP | A-2008-100605 | | 5/2008 |
| JP | A-2008-213556 | | 9/2008 |
| JP | A-2008-223584 | | 9/2008 |
| JP | 2008-231989 | * | 10/2008 |
| JP | A-2008-231989 | | 10/2008 |
| JP | A-2008-232036 | | 10/2008 |
| JP | A-2008-248757 | | 10/2008 |
| JP | A-2008-308142 | | 12/2008 |
| JP | A-2009-2285 | | 1/2009 |
| JP | A-2009-18606 | | 1/2009 |
| JP | A-2009-40163 | | 2/2009 |
| JP | A-2009-90968 | | 4/2009 |
| JP | A-2009-108828 | | 5/2009 |
| JP | A-2009-108829 | | 5/2009 |
| JP | A-2009-108830 | | 5/2009 |
| JP | A-2009-113515 | | 5/2009 |
| JP | A-2009-113516 | | 5/2009 |
| JP | A-2009-113517 | | 5/2009 |
| JP | A-2009-114862 | | 5/2009 |
| JP | 2009-127456 | * | 6/2009 |
| JP | A-2009-121426 | | 6/2009 |
| JP | A-2009-121427 | | 6/2009 |
| JP | A-2009-127456 | | 6/2009 |
| JP | A-2009-143400 | | 7/2009 |
| JP | A-2009-143401 | | 7/2009 |
| JP | A-2009-143402 | | 7/2009 |
| JP | A-2009-174503 | | 8/2009 |
| JP | A-2010-106793 | | 5/2010 |
| JP | A-2010-106817 | | 5/2010 |
| WO | WO 2008/050782 | * | 5/2008 |
| WO | WO 2010/049766 A1 | | 5/2010 |

OTHER PUBLICATIONS

Machine Translation: JP 2009-127456.*
Machine Translation: JP 2001-065402.*
Office Action issued in Japanese Patent Application No. 2011-537606 dated May 22, 2012 (with partial translation).
International Search Report for International Patent Application No. PCT/JP2009/005149, mailed on Oct. 27, 2009 (w/ English translation).

* cited by examiner

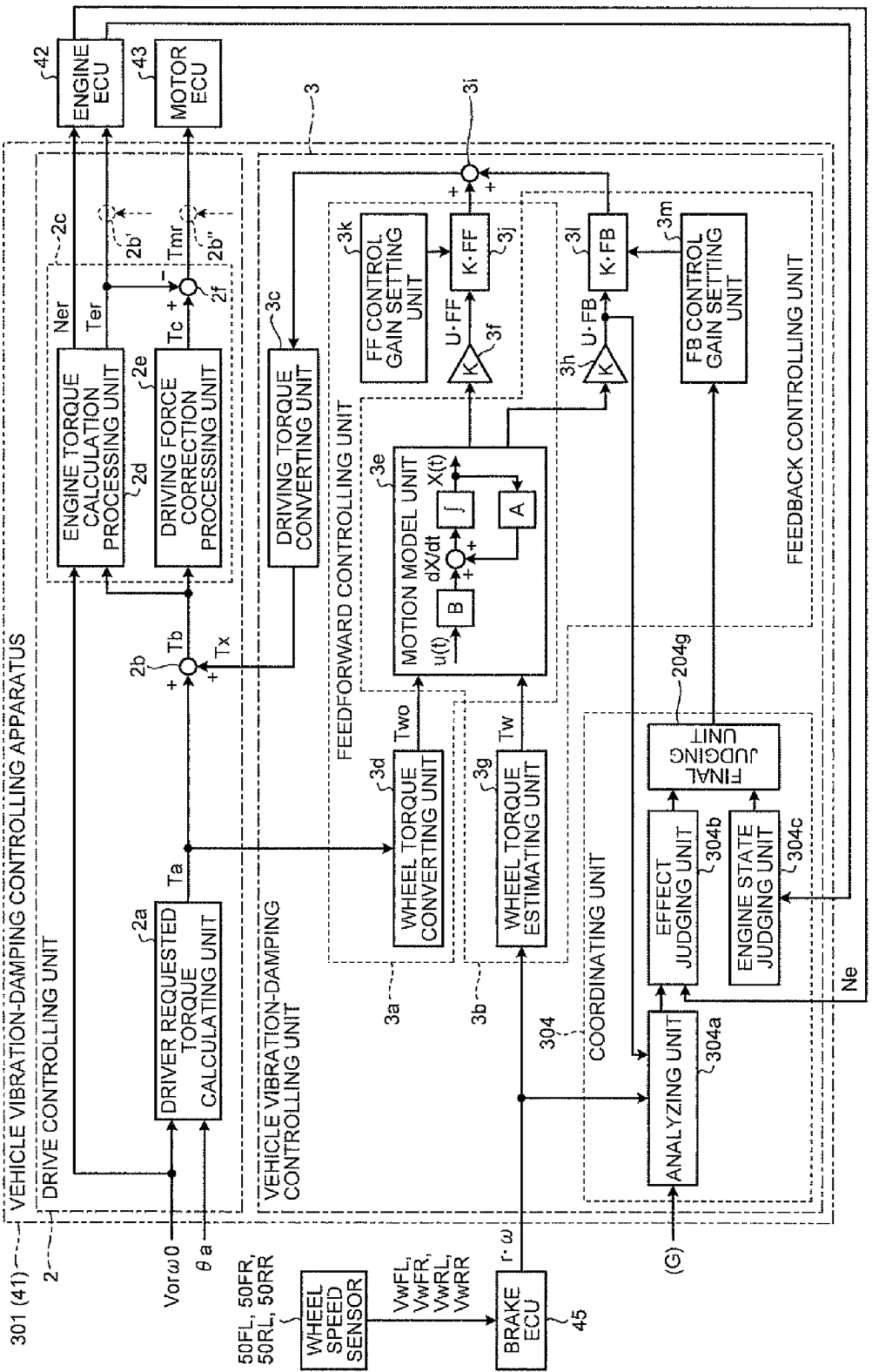

VEHICLE VIBRATION-DAMPING CONTROLLING APPARATUS

FIELD

The present invention relates to a vehicle vibration-damping controlling apparatus.

BACKGROUND

The vehicle vibration-damping controlling apparatus for executing so-called sprung vibration-damping control to control a power source and suppress sprung vibration of a vehicle is known as a conventional vehicle vibration-damping controlling apparatus. As such conventional vehicle vibration-damping controlling apparatus, for example, a vehicle stabilization control system is disclosed in the Patent Literature 1. The vehicle stabilization control system adds estimated drive shaft torque to travel resistance disturbance to obtain current driving force and obtains pitching vibration corresponding to the current driving force from a state equation and an output equation of a vehicle body sprung vibration model. Then, the vehicle stabilization control system obtains a correction value with which the pitching vibration represented by the output equation rapidly converges to 0 and corrects basic requested engine torque based on the correction value, adjusts an intake air amount, a fuel injection amount and an ignition timing of an engine as the power source based on the corrected engine torque to control the driving force of the vehicle, thereby suppressing the sprung vibration of the vehicle.

CITATION LIST

Patent Literature

Patent Literature 1: Japanese Patent Application Laid-open No. 2006-069472

SUMMARY

Technical Problem

The above-described vehicle stabilization control system disclosed in the Patent Literature 1 might execute various pieces of judging control such as accidental fire judgment to monitor rotational variation of an output shaft (crankshaft) of the engine and detect occurrence of the accidental fire of the engine when the rotational variation amount becomes larger than a predetermined allowable level in order to excellently operate the engine, which is the power source, for example. There is a case in which the torque generated by the engine for suppressing the sprung vibration affects the above-described rotational variation amount by executing the vibration-damping control, for example, in the vehicle stabilization control system, so that it is desired to execute more appropriate vibration-damping control also taking account the above-described various pieces of judging control.

An object of the present invention is to provide the vehicle vibration-damping controlling apparatus capable of appropriately executing the vibration-damping control.

Solution to Problem

In order to achieve the above mentioned object, a vehicle vibration-damping controlling apparatus according to the present invention for executing vibration-damping control to control a power source loaded on a vehicle and suppress sprung vibration of the vehicle, wherein a control amount of the vibration-damping control is changed based on a judgment target amount that is used in judging control and variable accompanied by an execution of the vibration-damping control.

In the vehicle vibration-damping controlling apparatus, the control amount may be changed according to a relationship with the judgment target amount.

In the vehicle vibration-damping controlling apparatus, the control amount may be limited when a frequency of the control amount and a frequency of the judgment target amount are equivalent to each other.

In the vehicle vibration-damping controlling apparatus, the control amount may be limited when an amplitude of the control amount is larger than a predetermined amplitude set in advance.

In the vehicle vibration-damping controlling apparatus, the control amount may be set based on a rotational speed of a wheel of the vehicle.

In the vehicle vibration-damping controlling apparatus, the power source may include at least an internal-combustion engine, the judgment target amount may be a rotational variation amount of an output shaft of the internal-combustion engine, and the judging control may be a control to judge accidental fire of the internal-combustion engine based on the rotational variation amount.

In the vehicle vibration-damping controlling apparatus, the control amount may be changed by executing a filter process corresponding to the judgment target amount to a signal corresponding to an input physical amount for setting the control amount or to a signal corresponding to the control amount.

In the vehicle vibration-damping controlling apparatus, the control amount may be changed by multiplying a control gain corresponding to the judgment target amount by the control amount or a physical amount corresponding to the control amount.

In order to achieve the above mentioned object, a vehicle vibration-damping controlling apparatus according to the present invention for executing vibration-damping control to control a power source loaded on a vehicle and suppress sprung vibration of the vehicle, wherein a control amount of the vibration-damping control is limited when a frequency of the control amount of the vibration-damping control and a frequency of a rotational speed of an output shaft of an internal-combustion engine composing the power source are equivalent to each other.

Advantageous Effects of Invention

The vehicle vibration-damping controlling apparatus according to the present invention can appropriately execute the vibration-damping control.

BRIEF DESCRIPTION OF DRAWINGS

FIG. 7 is a schematic diagram illustrating a functional configuration example of the vehicle vibration-damping controlling apparatus according to a third embodiment in a form of a control block.

DESCRIPTION OF EMBODIMENTS

Embodiments of a vehicle vibration-damping controlling apparatus according to the present invention is hereinafter described in detail with reference to the drawings. Meanwhile, the invention is not limited by the embodiments. Also, components in the following embodiments include a component, which can be easily replaced by one skilled in the art, or a substantially identical component.

First Embodiment

Figure 1:
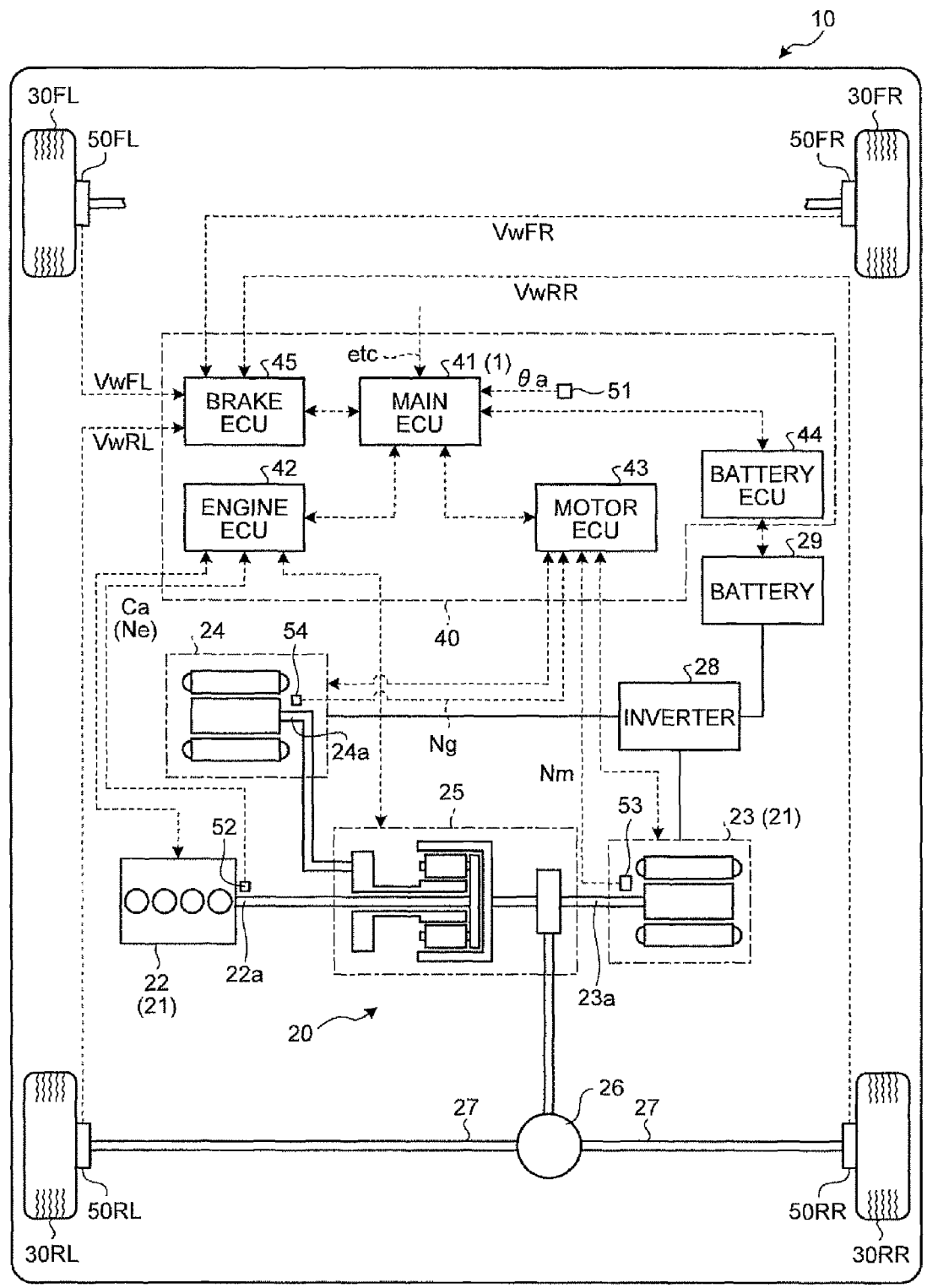
FIG. 1 is a view illustrating a schematic configuration example of a vehicle to which a vehicle vibration-damping controlling apparatus according to a first embodiment is applied.
Figure 2:
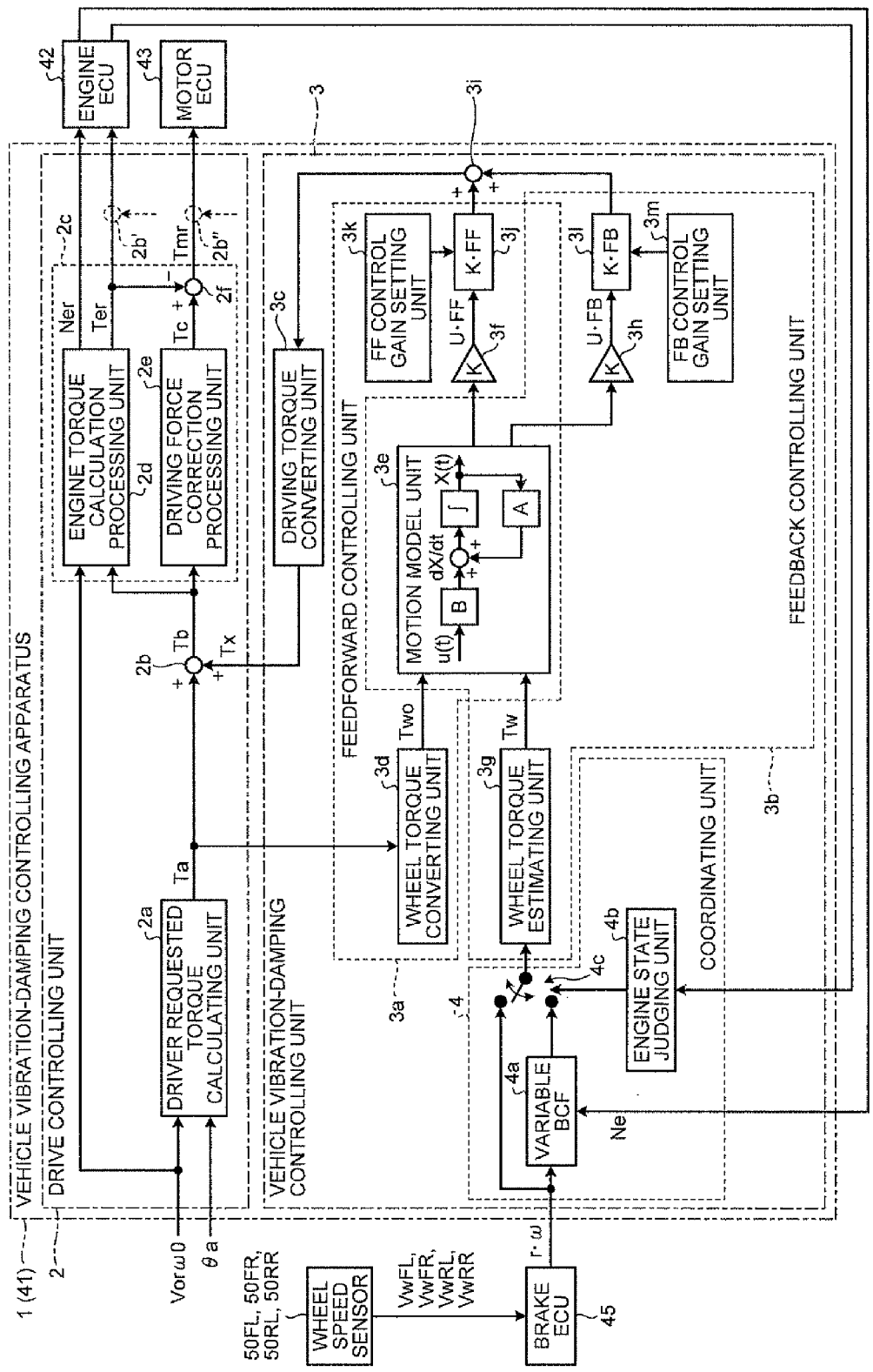
FIG. 2 is a schematic diagram illustrating a functional configuration example of the vehicle vibration-damping controlling apparatus according to the first embodiment in a form of a control block.
Figure 3:
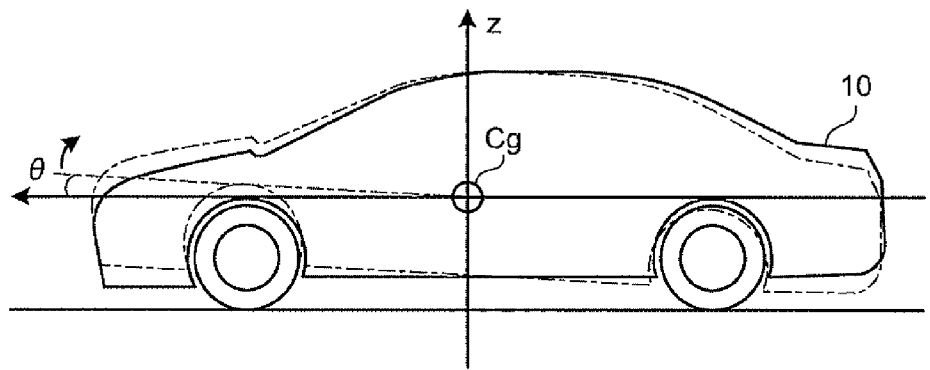
FIG. 3 is a view illustrating a state variable of vehicle body vibration.
Figure 4:
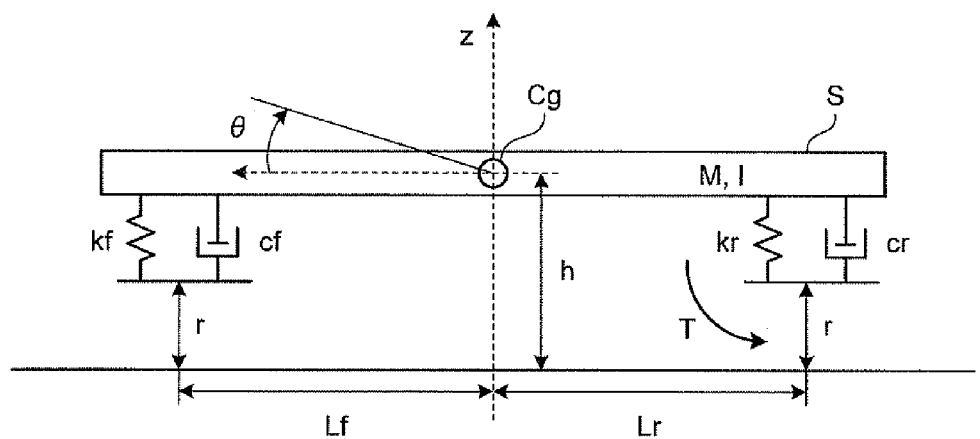
FIG. 4 is a view illustrating an example of a mechanical motion model of the vehicle body vibration.
Figure 5:
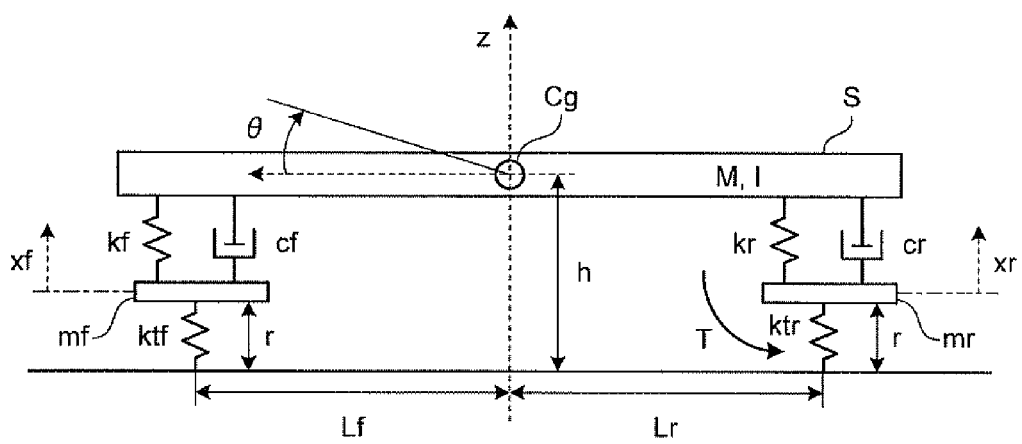
FIG. 5 is a view illustrating an example of the mechanical motion model of the vehicle body vibration.

FIG. 1 is a view illustrating a schematic configuration example of a vehicle to which the vehicle vibration-damping controlling apparatus according to a first embodiment is applied, FIG. 2 is a schematic diagram illustrating a functional configuration example of the vehicle vibration-damping controlling apparatus according to the first embodiment in a form of a control block, FIG. 3 is a view illustrating a state variable of vehicle body vibration and FIGS. 4 and 5 are views illustrating an example of a mechanical motion model of the vehicle body vibration.

Although it is described that a vehicle vibration-damping controlling apparatus 1 according to this embodiment is applied to a vehicle 10, which is a hybrid vehicle loaded with a hybrid-type drive device 20 including an engine 22 as an internal-combustion engine such as a gasoline engine, a diesel engine and an LPG engine and an electric motor 23 as a motor as a power source 21 for travel, as illustrated in FIG. 1, this may be applied to a vehicle provided with only the engine or only the motor as the power source 21. Although the vehicle vibration-damping controlling apparatus 1 is described as being built in a main ECU 41 to be described later, this may be composed separate from the main ECU 41 and connected to the main ECU 41. A loading position of the power source 21 of the vehicle 10, a drive type of the vehicle 10 and the like are not limited to those illustrated in FIG. 1. The vehicle 10 illustrated in FIG. 1 is rear-wheel-drive-type of which drive wheels are wheels 30RR and 30RL, which are right and left rear wheels.

The vehicle vibration-damping controlling apparatus 1 executes so-called sprung vibration-damping control (vibration-damping control) for controlling the power source 21 to suppress sprung vibration of the vehicle 10. Herein, the sprung vibration of the vehicle 10 is intended to mean vibration of 1 to 4 Hz (a frequency component significantly appearing differs depending on a vehicle type and a configuration of the vehicle, and most vehicles have the frequency component of approximately 1.5 Hz), for example, out of the vibration of which source is a road surface, which occurs in a vehicle body of the vehicle 10 by an input from the road surface to wheels 30FL, 30FR, 30RL and 30RR of the vehicle 10 through a suspension according to irregularity of the road surface, and the sprung vibration of the vehicle 10 includes a component in a pitch direction or in a bounce direction (vertical direction) of the vehicle 10. The sprung vibration-damping is herein intended to mean suppression of the above-described sprung vibration of the vehicle 10.

The vehicle vibration-damping controlling apparatus 1 adjusts "wheel torque" acting from the wheel on the road surface (torque acting between the wheel and the road surface, which the wheel touches) by allowing the power source 21 to output driving torque (driving force) of an opposite phase when the sprung vibration of the vehicle 10 occurs, thereby suppressing the above-described vibration. That is to say, the vehicle vibration-damping controlling apparatus 1 controls the driving torque generated by the power source 21, thereby generating vibration-damping torque, which is the wheel torque for suppressing the sprung vibration, on the wheels 30RL and 30RR, to suppress the sprung vibration, and thereby improving steering stability of a driver, driving quality of a passenger and the like.

Specifically, as illustrated in FIG. 1, the drive device 20 allows the driving force to act on the wheels 30RL and 30RR according to depression operation of an accelerator pedal loaded on the vehicle 10 by the driver, that is to say, accelerator operation. Herein, the drive device 20 is provided with the engine 22 and the electric motor (motor generator) 23 as the power source 21. Further, the drive device 20 includes a generator (motor generator) 24, a power distributing mechanism 25, a speed reducer 26 and a drive shaft 27.

The engine 22 allows a piston to reciprocate by combustion of fuel in a combustion chamber, thereby generating mechanical power (engine torque) in an output shaft (crankshaft) 22a. The electric motor 23, which is an alternating-current synchronous motor, is driven by alternating-current power, thereby generating mechanical power (motor torque) in a drive shaft (rotor shaft) 23a. The generator 24 also has a configuration as the alternating-current synchronous motor as the electric motor 23. The electric motor 23 mainly outputs the driving force and the generator 24 mainly receives an output of the engine 22 to generate power. The electric motor 23 and the generator 24 are connected to an inverter 28 and the inverter 28 is connected to a battery 29. The power distributing mechanism 25 distributes the output of the engine 22 to the generator 24 and the wheels 30RL and 30RR, transmits the output from the electric motor 23 to the wheels 30RL and 30RR through the speed reducer 26 and the drive shaft 27, and serves as a transmission relating to the driving force transmitted to the wheels 30RL and 30RR through the speed reducer 26 and the drive shaft 27. Meanwhile, although not herein illustrated, the vehicle 10 is also provided with a so-called brake device and a steering device.

The vehicle 10 is loaded with an electronic control unit (ECU) 40, and each unit is controlled by the ECU 40 and various pieces of control are executed. The ECU 40 includes an arithmetic processing unit and a storage unit. The ECU 40 herein includes the main ECU 41 for controlling an entire vehicle 10 in an integrated manner, an engine ECU 42 for controlling the engine 22 and the power distributing mechanism 25, a motor ECU 43 for controlling the electric motor 23 and the generator 24, a battery ECU 44 for controlling the battery 29 and a brake ECU 45 for controlling the brake device (not illustrated), for example. The main ECU 41 communicates detection signals of various sensors, control commands and the like between the same and the engine ECU 42, the motor ECU 43, the battery ECU 44 and the brake ECU 45.

Electric signals corresponding to a wheel speed Vwi (i=FL, FR, RL and RR) of each wheel 30i (i=FL, FR, RL and RR), an accelerator pedal depression amount θa corresponding to the accelerator operation by the driver, a crank angle Ca of the output shaft 22a, a motor rotational number Nm and a generator rotational number Ng corresponding to rotational positions of the drive shafts 23a and 24a and rotational speeds of the drive shafts 23a and 24a and the like detected by a wheel speed sensor 50i (i=FL, FR, RL and RR), an accelerator pedal sensor 51, a crank angle sensor 52, motor generator rotational number sensors 53 and 54 and the like are input to the ECU 40. For example, the engine ECU 42 can distinguish each step of intake, compression, expansion (explosion) and exhaust in each cylinder of the engine 22 based on the crank angle Ca detected by the crank angle sensor 52 and calculate the engine rotational number Ne corresponding to the rotational speed of the output shaft 22a. Also, herein, as illustrated in FIG. 2, in the ECU 40, the electric signal corresponding to the wheel speed Vwi is input to the brake ECU 45 and the brake ECU 45 calculates an average value r·ω of the wheel speed Vwi corresponding to each wheel 30i to output to the main ECU 41 doubled as the vehicle vibration-damping controlling apparatus 1.

The main ECU 41 sets a requested output from an accelerator opening degree corresponding to the accelerator pedal depression amount θa, for example, and determines distribution of the output of the engine 22 and the output of the electric motor 23 to realize maximum efficiency according to a travel state of the vehicle 10 based on the requested output to output each control command to the engine ECU 42 and the motor ECU 43. Then, the vehicle vibration-damping controlling apparatus 1 built in the main ECU 41 calculates driver requested torque (torque corresponding to requested driving force) Ta, which is the driving torque of the power source 21 of the drive device 20 requested by the driver and the basis of the control, and corrects the driver requested torque Ta in order to execute the vibration-damping control for suppressing the sprung vibration. That is to say, in the vehicle vibration-damping controlling apparatus 1, the driver requested torque Ta is corrected based on the vibration-damping torque (the wheel torque requested in the vibration-damping control), which is a control amount of the vibration-damping control, and the control command corresponding to corrected final requested torque is output to the power source 21. The control command output to the power source 21 is a command including an operation amount of the power source 21 to be input to the power source 21 in order to adjust the driving torque of the power source 21, which is a control target, to the final requested torque so as to adjust the vibration-damping torque acting on the wheels 30RL and 30RR.

Herein, the control amount of the sprung vibration-damping control by the vehicle vibration-damping controlling apparatus 1 is a value, which should be adjusted to a desired value for suppressing the sprung vibration of the vehicle 10, that is to say, the value, which should be controlled for suppressing the sprung vibration of the vehicle 10, in the vibration-damping control. The control amount of the vibration-damping control of this embodiment is the vibration-damping torque requested to act on the wheels 30RL and 30RR in the vibration-damping control in order to suppress the sprung vibration. The operation amount of the power source 21 is a value affecting the vibration-damping torque (output), which is the control amount of the vibration-damping control using the power source 21 by being input to the power source 21, which is the control target, that is to say, the value for adjusting the vibration-damping torque through the power source 21. That is to say, the operation amount of the power source 21 is a value input to the power source 21 for adjusting an actual value of the vibration-damping torque to a target value. The operation amount of the power source 21 of this embodiment includes an operation amount for the engine 22 and an operation amount for the electric motor 23, for example. The operation amount for the engine 22 is a throttle opening degree and an ignition timing when the engine 22 is the gasoline engine, and a fuel injection amount when the engine 22 is the diesel engine, for example. The operation amount for the electric motor 23 is a supply current amount and the like, for example. The engine ECU 42 and the motor ECU 43 calculate the operation amounts of the engine 22 and the electric motor 23 corresponding to the final requested torque input from the vehicle vibration-damping controlling apparatus 1 and output the control commands including signals corresponding to the operation amounts to the engine 22 and the electric motor 23 to control drive of them.

Specifically, the vehicle vibration-damping controlling apparatus 1 includes a drive controlling unit 2 and a vehicle vibration-damping controlling unit 3, as illustrated in FIG. 2. The drive controlling unit 2 includes a driver requested torque calculating unit 2a, an adder 2b and a torque distributing unit 2c. The vehicle vibration-damping controlling unit 3 includes a feedforward controlling unit 3a, a feedback controlling unit 3b and a driving torque converting unit 3c.

The driver requested torque calculating unit 2a calculates the driver requested torque Ta by a known optional method, for example, based on the accelerator pedal depression amount θa as a value corresponding to the drive request from the driver for the vehicle 10 and a vehicle speed V or an angular speed ω0 of the wheels 30RL and 30RR to output to the adder 2b. The adder 2b calculates final requested torque Tb obtained by correcting the driver requested torque Ta by a vibration-damping torque correction amount Tx calculated by the vehicle vibration-damping controlling unit 3 to be described later and outputs the final requested torque Tb to the torque distributing unit 2c. The torque distributing unit 2c distributes the final requested torque Tb to requested engine torque Ter and requested motor torque Tmr to output to the engine ECU 42 and the motor ECU 43, respectively.

The torque distributing unit 2c includes an engine torque calculation processing unit 2d, a driving force correction processing unit 2e and a subtracter 2f, for example, and the final requested torque Tb calculated by the above-described adder 2b is input to the engine torque calculation processing unit 2d and a driving force correction processing unit 2e. The engine torque calculation processing unit 2d calculates a requested engine rotational number Ner and requested engine torque Ter from the final requested torque Tb such that engine efficiency (fuel consumption) of the engine 22 becomes better according to the travel state of the vehicle 10 based on an engine control map based on a so-called optimal fuel consumption line and the vehicle speed V or the angular speed ω0 of the wheels 30RL and 30RR, for example, to output to the engine ECU 42, the subtracter 2f and the like. The driving force correction processing unit 2e calculates corrected final requested torque Tc by correcting the final requested torque Tb and applying guard to the final requested torque Tb based on a state of charge SOC of the battery 29, a maximum output of the electric motor 23 corresponding to fact and specification of the electric motor 23, basic performance of the hybrid-type drive device 20, or a change amount of the final requested torque Tb, for example, to output to the subtracter 2f and the like.

The subtracter 2f subtracts the requested engine torque Ter from the corrected final requested torque Tc to obtain the requested motor torque Tmr and outputs the same to the motor ECU 43. The engine ECU 42 and the motor ECU 43 output an engine control command including a signal corresponding to a target operation amount of the engine 22 and a motor control command including a signal corresponding to a target operation amount of the electric motor 23 for realizing the requested engine rotational number Ner, the requested engine torque Ter and the requested motor torque Tmr to the engine 22 and the electric motor 23, respectively, to control the drive.

Next, the vehicle vibration-damping controlling unit 3 calculates the vibration-damping torque, which is the control amount of the vibration-damping control, to set the vibration-damping torque correction amount Tx corresponding to the vibration-damping torque. For example, when the drive device 20 operates based on the drive request of the driver and variation of the wheel torque occurs and when disturbance torque acts by the input from the road surface to the wheel 30i of the vehicle 10 according to the irregularity of the road surface during the travel of the vehicle 10, in the vehicle body of the vehicle 10 illustrated in FIG. 3, bounce vibration in a vertical direction (z direction) of a center of gravity Cg of the vehicle body and pitch vibration in a pitch direction (θ direction) around the center of gravity of the vehicle body might occur.

Then, the vehicle vibration-damping controlling unit 3 calculates displacements of the vehicle body z and θ and change ratios thereof dz/dt and dθ/dt when inputting a value obtained by converting the driver requested torque Ta corresponding to the drive request of the driver to the wheel torque and an estimated value of current wheel torque to a mechanical motion model of the pitch/bounce vibration of the vehicle body of the vehicle 10, and power control of the power source 21 is performed such that the state variables obtained from the model converge to 0 and the driving torque is adjusted.

Each of the feedforward controlling unit 3a and the feedback controlling unit 3b has a so-called optimal regulator configuration. The feedforward controlling unit 3a performs feedforward control based on the driver requested torque (requested driving force) for the vehicle 10 and includes a wheel torque converting unit 3d, a motion model unit 3e and a FF secondary regulator unit 3f. The feedback controlling unit 3b performs feedback control based on the wheel speed of the wheel of the vehicle 10 and includes a wheel torque estimating unit 3g, the motion model unit 3e also used by the feedforward controlling unit 3a and a FB secondary regulator unit 3h.

In the feedforward controlling unit 3a, a value obtained by converting the driver requested torque Ta to the wheel torque by the wheel torque converting unit 3d (driver requested wheel torque Two) is input to the motion model unit 3e. In the feedforward controlling unit 3a, response of the state variable of the vehicle 10 to the input torque is calculated by the motion model unit 3e and FF vibration-damping torque U·FF is calculated as a correction amount of the driver requested wheel torque Two to converge the state variable to a minimum value based on predetermined gain K to be described later by the FF secondary regulator unit 3f. The FF vibration-damping torque U·FF is a FF control amount of the vibration-damping control set by a feedforward control system based on the driver requested torque Ta.

In the feedback controlling unit 3b, a wheel torque estimated value Tw is calculated based on the average value r·ω of the wheel speed by the wheel torque estimating unit 3g as is to be described later, and the wheel torque estimated value Tw is input to the motion model unit 3e as the disturbance input. In the feedback controlling unit 3b, similarly, the response of the state variable of the vehicle 10 is calculated by the motion model unit 3e, and the FB vibration-damping torque U·FB is calculated as a correction amount of the driver requested wheel torque Two to converge the state variable to the minimum value by the FB secondary regulator unit 3h. The FE vibration-damping torque U·FB is a FB control amount of the vibration-damping control set by a feedback control system according to a variation of the wheel speed based on external force by the input from the road surface to the wheel 30i. Meanwhile, in the feedback controlling unit 3b, the average value r·ω of the wheel speed, which is an input signal, is input to the wheel torque estimating unit 3g through a coordinating unit 4, and the coordinating unit 4 will be described later in detail.

In the vehicle vibration-damping controlling unit 3, the FF vibration-damping torque U·FF and the FB vibration-damping torque U·FB are added to each other by an adder 3i and the vibration-damping torque, which is a total control amount in the vibration-damping control, is calculated. Then, in the vehicle vibration-damping controlling unit 3, the vibration-damping torque is converted to the vibration-damping torque correction amount Tx converted to a unit of the driving torque of the drive device 20, that is to say, a unit of the driver requested torque Ta by the driving torque converting unit 3c to be output to the adder 2b. That is to say, the vehicle vibration-damping controlling apparatus 1 corrects the driver requested torque Ta based on the vibration-damping torque correction amount Tx obtained by using the mechanical motion model to change to the final requested torque (driving torque) capable of generating the vibration-damping torque (wheel torque) for suppressing the sprung vibration on the wheels 30RL and 30RR.

Therefore, the vehicle vibration-damping controlling apparatus 1 can adjust the final requested torque generated by the power source 21 based on the driver requested torque Ta and the vibration-damping torque correction amount Tx corresponding to the vibration-damping torque, thereby generating the driver requested wheel torque on the wheels 30RL and 30RR and generating the vibration-damping torque to suppress the sprung vibration. That is to say, the vehicle vibration-damping controlling apparatus 1 can execute the vibration-damping control to generate the vibration-damping torque on the wheels 30RL and 30RR by controlling the power generated by the engine 22 and the electric motor 23, and suppress the vibration occurring in the vehicle body by changing the wheel torque of the wheels 30RL and 30RR.

Herein, in the vibration-damping control in the vehicle vibration-damping controlling apparatus 1, as described above, the mechanical motion model in the pitch direction and in the bounce direction of the vehicle body of the vehicle 10 is supposed and a state equation of the state variable in the pitch direction or in the bounce direction is composed to which the driver requested wheel torque Two and the wheel torque estimated value Tw (disturbance) are input. Then, the input (vibration-damping torque) to converge the above-described state variable to 0 is determined by using an optimal regulator theory from the state equation, and the driver requested torque Ta is corrected based on the obtained vibration-damping torque.

As the above-described mechanical motion model, for example, as illustrated in FIG. 4, the vehicle body is regarded as a rigid body S having a mass M and inertia moment I, and suppose that the rigid body S is supported by a front wheel suspension having an elastic ratio kf and a damping ratio cf and a rear wheel suspension having an elastic ratio kr and a damping ratio cr (sprung vibration model of the vehicle body of the vehicle 10). In this case, a motion equation in the bounce direction and a motion equation in the pitch direction of the center of gravity Cg of the vehicle body can be represented as in a following equation 1.

$$M\frac{d^2z}{dt^2} = -kf(z + Lf \cdot \theta) - \quad (1a)$$
$$cf\left(\frac{dz}{dt} + Lf \cdot \frac{d\theta}{dt}\right) - kr(z - Lr \cdot \theta) - cr\left(\frac{dz}{dt} - Lr \cdot \frac{d\theta}{dt}\right)$$

$$I\frac{d^2z}{dt^2} = -Lf\left\{kf(z + Lf \cdot \theta) + cf\left(\frac{dz}{dt} + Lf \cdot \frac{d\theta}{dt}\right)\right\} + \quad (1b)$$
$$Lr\left\{kr(z - Lr \cdot \theta) + cr\left(\frac{dz}{dt} - Lr \cdot \frac{d\theta}{dt}\right)\right\} + \frac{h}{r} \cdot T$$

In the above-described equation 1, Lf and Lr represent distances from the center of gravity Cg to the front wheel shaft and the rear wheel shaft, r represents a wheel radius and h represents height of the center of gravity Cg from the road surface, respectively.

The above-described equations (1a) and (1b) can be rewritten to a form of the state equation (of a linear system) as represented in a following equation (2a) by setting the displacements z and θ of the vehicle body of the vehicle 10 and the change ratios thereof dz/dt and dθ/dt to a state variable vector X(t).

$$dX(t)/dt = A \cdot X(t) + B \cdot u(t) \quad (2a)$$

Above-described X(t), A and B are represented as X(t), A and B in a following equation 2.

$$X(t) = \begin{pmatrix} z \\ dz/dt \\ \theta \\ d\theta/dt \end{pmatrix}, A = \begin{pmatrix} 0 & 1 & 0 & 0 \\ a1 & a2 & a3 & a4 \\ 0 & 0 & 0 & 1 \\ b1 & b2 & b3 & b4 \end{pmatrix}, B = \begin{pmatrix} 0 \\ 0 \\ 0 \\ p1 \end{pmatrix} \quad [\text{Equation 2}]$$

Each element a1 to a4 and b1 to b4 of a matrix A is given by combining coefficients of z, θ, dz/dt and dθ/dt to the above-described equations (1a) and (1b), and a1=−(kf+kr)/M, a2=−(cf+cr)/M, a3=−(kf·Lf−kr·Lr)/M, a4=−(cf·Lf−cr·Lr)/M, b1=−(Lf·kf−Lr·kr)/I, b2=−(Lf·cf−Lr·cr)/I, b3=−(Lf2·kf+Lr2·kr)/I and b4=−(Lf2·cf+Lr2·cr)/I are satisfied. Also, u(t) is represented as u(t)=T, and this is an input of the system represented by the state equation (2a). Therefore, an element p1 of a matrix B is represented as p1=h/(I·r) by the above-described equation (1b).

In the above-described state equation (2a), when $$u(t) = -K \cdot X(t) \quad (2b)$$

the state equation (2a) is $$dX(t)/dt = (A - BK) \cdot X(t) \quad (2c).$$

Therefore, when solving a differential equation (2c) of the state variable vector X(t) by setting an initial value $X_0(t)$ of X(t) to $X_0(t) = (0, 0, 0, 0)$ (suppose that there is no vibration before input of torque), if the gain K to converge magnitude of X(t), that is to say, the displacements in the bounce direction and in the pitch direction and a time rate of change thereof to 0 is determined, the vibration-damping torque u(t) to suppress the bounce/pitch vibration is determined.

The gain K can be determined by using the so-called optimal regulator theory, and it is known that X(t) stably converges in the state equation (2a) when a value of an evaluation function in a quadratic form $$J = \int (X^T Q X + u^T R u) dt \quad (3a)$$

(integration range is 0 to ∞) is the minimum, and a matrix K to minimize the evaluation function J is given by $K = R^{-1} \cdot B^T \cdot P$. Herein, P represents a solution of a Ricatti equation [−dP/dt = $A^T P + PA + Q - PBR^{-1}B^T P$]. The Ricatti equation can be solved by an optional method known in a field of the linear system, thereby determining the gain K.

Meanwhile, Q and R in the evaluation function J and the Ricatti equation represent optionally set semi-positive definite symmetric matrix and positive definite symmetric matrix, respectively, and weighting matrices of the evaluation function J determined by a designer of the system. For example, in a case of the motion model here, by setting Q and R to $$Q = \begin{pmatrix} 1 & 0 & 0 & 0 \\ 0 & 10^3 & 0 & 0 \\ 0 & 0 & 1 & 0 \\ 0 & 0 & 0 & 10^2 \end{pmatrix}, R = (1)$$

and by setting norm (magnitude) of a specific component such as dz/dt and dθ/dt out of components of the state vector to be larger than the norm of another component such as z and θ in the equation (3a), the component of which norm is set to be larger relatively and more stably converges. Also, when a value of a component of Q is made larger, transient property is critical, that is to say, a value of the state vector rapidly converges to a stable value, and when a value of R is made larger, consumption energy is reduced.

In actual sprung vibration-damping control in the vehicle vibration-damping controlling unit 3, as illustrated in a block diagram in FIG. 2, the state variable vector X(t) is calculated by solving the differential equation of the equation (2a) by using a torque input value by the motion model unit 3e. Subsequently, a value u(t) obtained by multiplying the gain K determined so as to converge the state variable vector X(t) to 0 or a minimum value as described above by the state variable vector X(t) being an output of the motion model unit 3e by the FF secondary regulator unit 3f and the FB secondary regulator unit 3h, that is to say, the FF vibration-damping torque U·FF and the FB vibration-damping torque U·FB are converted to a unit of the driver requested torque Ta of the power source 21 by the driving torque converting unit 3c, and the driver requested torque Ta is corrected by the adder 2b. The system represented by the equations (1a) and (1b) is a resonance system, and a value of the state variable vector for an optional input is substantially only a component of a natural frequency of the system. Therefore, by configuring such that the driver requested torque Ta is corrected by (a converted value of) u(t), a component of the natural frequency of the system out of the driver requested torque Ta, that is to say, the component, which allows the pitch/bounce vibration to occur in the vehicle body of the vehicle 10, is corrected to suppress the pitch/bounce vibration in the vehicle body of the vehicle 10. When the component of the natural frequency of the system disappears from the driver requested torque Ta, out of the control command corresponding to the driver requested torque Ta output to the power source 21, the component of the natural frequency of the system is only −u(t) and the vibration by Tw (disturbance) converges.

Meanwhile, as the mechanical motion model in the bounce direction or in the pitch direction of the vehicle body of the vehicle 10, for example, as illustrated in FIG. 5, a model taking into account spring elasticity of tires of the front wheel and the rear wheel (sprung/unsprung vibration model of the vehicle body of the vehicle 10) may be adopted in addition to the configuration in FIG. 4. Supposing that each of tires of the front wheel and the rear wheel has elastic ratios ktf and ktr, respectively, the motion equation in the bounce direction and the motion equation in the pitch direction of the center of gravity Cg of the vehicle body can be represented as a following equation 4. In the equation 4, xf and xr represent unsprung displacement amounts of the front wheel and the rear wheel and mf and mr represent unsprung masses of the front wheel and the rear wheel. The equations (4a) to (4d) compose the state equation as the equation (2a) as in the case in FIG. 4 by setting z, θ, xf and xr and temporal differential values thereof the state variable vector (the matrix A has 8 rows and 8 columns and the matrix B has 8 rows and 1 column), thereby determining a gain matrix K to converge the magnitude of the state variable vector to 0.

$$M\frac{d^2z}{dt^2} = -kf(z+Lf\cdot\theta-xf)-cf\left(\frac{dz}{dt}+Lf\cdot\frac{d\theta}{dt}-\frac{dxf}{dt}\right)- \tag{4a}$$
$$kr(z-Lf\cdot\theta-xr)-cr\left(\frac{dz}{dt}-Lr\cdot\frac{d\theta}{dt}-\frac{dxr}{dt}\right)$$

$$I\frac{d^2z}{dt^2} = -Lf\left\{kf(z+Lf\cdot\theta-xf)+cf\left(\frac{dz}{dt}+Lf\cdot\frac{d\theta}{dt}-\frac{dxf}{dt}\right)\right\}+ \tag{4b}$$
$$Lr\left\{kr(z-Lr\cdot\theta-xr)+cr\left(\frac{dz}{dt}-Lr\cdot\frac{d\theta}{dt}-\frac{dxr}{dt}\right)\right\}+\frac{h}{r}\cdot T$$

$$mf\frac{d^2xf}{dt^2} = kf(z+Lf\cdot\theta-xf)+cf\left(\frac{dz}{dt}+Lf\cdot\frac{d\theta}{dt}-\frac{dxf}{dt}\right)+ktf\cdot xf \tag{4c}$$

$$mr\frac{d^2xr}{dt^2} = kr(z+Lr\cdot\theta-xr)+cr\left(\frac{dz}{dt}-Lr\cdot\frac{d\theta}{dt}-\frac{dxr}{dt}\right)+ktr\cdot xr \tag{4d}$$

Herein, although it may be configured such that the wheel torque is actually detected by a wheel torque sensor and a wheel six-component force transducer, a wheel torque estimated value Tw estimated by the wheel torque estimating unit $3g$ from another detectable value of the traveling vehicle 10 is herein used. The wheel torque estimated value Tw can be estimated and calculated by a next equation (5) by using temporal differentiation of an average value ω of a wheel rotational speed or the average value r·ω of the wheel speed obtained by the wheel speed sensor corresponding to each wheel, for example.

$$Tw = M\cdot r^2\cdot d\omega/dt \tag{5}$$

In the above-described equation (5), M represents the mass of the vehicle and r represents the wheel radius. That is to say, when the total sum of the driving force generated at a position at which the driving wheel touches the road surface is equal to the total driving force M·G (G is acceleration) of the vehicle 10, the wheel torque estimated value Tw is given by a next equation (5a).

$$Tw = M\cdot G\cdot r \tag{5a}$$

The acceleration G of the vehicle is given by a next equation (5b) by a differential value of the wheel speed r·ω.

$$G = r\cdot d\omega/dt \tag{5b}$$

Therefore, the wheel torque is estimated as in the above-described equation (5). Meanwhile, the wheel torque estimated value may be calculated based on not the wheel rotational speed but on a rotational number No of a rotating body rotating along with the rotation of the wheels 30RL and 30RR such as the engine rotational number Ne, the motor rotational number Nm and the generator rotational number Ng as actual measured values related to the vibration, or a transmission rotational speed if this is provided with the transmission and a turbine rotational speed if this is provided with a torque converter.

Meanwhile, the vehicle vibration-damping controlling unit 3 of this embodiment further includes a FF control correcting unit $3j$, a FF control gain setting unit $3k$, a FB control correcting unit $3l$ and a FB control gain setting unit $3m$. The FF control correcting unit $3j$ and the FB control correcting unit $3l$ correct the FF vibration-damping torque U·FF and the FB vibration-damping torque U·FB by multiplying the FF control gain K·FF and the FB control gain K·FB set by the FF control gain setting unit $3k$ and the FB control gain setting unit $3m$ by the FF vibration-damping torque U·FF and the FB vibration-damping torque U-FB, respectively, to output to the adder $3i$. Then, the FF control gain setting unit $3k$ and the FB control gain setting unit $3m$ set the FF control gain K·FF and the FB control gain K·FB according to the state of the vehicle 10. That is to say, the FF vibration-damping torque U·FF and the FB vibration-damping torque U·FB are corrected according to the state of the vehicle 10 by the FF control correcting unit $3j$ and the FB control correcting unit $3l$, respectively.

In the vehicle 10, there is a case in which various pieces of judging control such as accidental fire judging control for monitoring rotational variation of the output shaft $22a$ of the engine 22 and detecting occurrence of accidental fire of the engine 22 when an amount of the rotational variation becomes larger than a predetermined allowable level is executed, for example. In this case, in the vehicle vibration-damping controlling apparatus 1, a judgment target amount applied in the various pieces of judging control such as the rotational variation amount of the output shaft $22a$ might change along with execution of the vibration-damping control when controlling the output of the power source 21 such as the engine 22 in order to suppress the sprung vibration by the vibration-damping control, thereby affecting the various pieces of judging control such as the accidental fire judging control.

Therefore, the vehicle vibration-damping controlling apparatus 1 of this embodiment tries to allow the vibration-damping control to coordinate with the various pieces of judging control related to the power source 21 such as the accidental fire judging control, for example, by changing the vibration-damping torque, which is the control amount of the vibration-damping control, based on the judgment target amount, thereby appropriately executing the vibration-damping control. Specifically, the vehicle vibration-damping controlling apparatus 1 is provided with the coordinating unit 4 in the vehicle vibration-damping controlling unit 3 as a configuration to change the vibration-damping torque based on the judgment target amount, as illustrated in FIG. 2.

Herein, the judgment target amount is a physical amount, which is used in the various pieces of judging control and might vary along with the execution of the vibration-damping control, that is to say, the physical amount, which might vary along with output control of the power source 21. In this embodiment, it is described supposing that the power source 21 includes at least the engine 22, the judgment target amount is a rotational variation amount of the output shaft $22a$ of the engine 22, and the judging control based on the judgment target amount here is the accidental fire judging control for judging the accidental fire of the engine 22 based on the rotational variation amount of the output shaft $22a$ of the engine 22. That is to say, the vehicle vibration-damping controlling apparatus 1 can appropriately execute the accidental fire judging control and execute the appropriate vibration-damping control, thereby improving the steering stability of the driver, the driving quality of the passenger and the like.

Herein, as the rotational variation amount of the output shaft 22a of the engine 22, the variation amount of the engine rotational number Ne, which is the rotational number of the output shaft 22a, and of the engine torque Te, which is the torque generated in the output shaft 22a, can be used, for example. In the vehicle 10, the engine ECU 42 (refer to FIG. 1) composes an engine accidental fire judging unit. The engine ECU 42 always monitors the rotational variation of the output shaft 22a of the engine 22 to detect the occurrence of the accidental fire of the engine 22 when the rotational variation amount, herein the variation amount of the engine rotational number Ne becomes larger than a judgment value set in advance.

The coordinating unit 4 changes the vibration-damping torque, which is the control amount of the vibration-damping control, according to relationship with the engine rotational number Ne, which is the judgment target amount. According to this, the vehicle vibration-damping controlling apparatus 1 can change the vibration-damping torque when the relationship between the vibration-damping torque and the engine rotational number Ne might be the relationship to inhibit the judging control, for example, thereby limiting the vibration-damping torque. Herein, the coordinating unit 4 limits the vibration-damping torque when a frequency of the vibration-damping torque periodically applied in the vibration-damping control and a frequency of the engine rotational number Ne, which is the judgment target amount, might become equivalent to each other. According to this, the vehicle vibration-damping controlling apparatus 1 can limit the vibration-damping torque when the frequency of the vibration-damping torque and the frequency of the engine rotational number Ne might be equivalent to each other as the case in which the relationship between the vibration-damping torque and the engine rotational number Ne might be the relationship to inhibit the various pieces of judging control.

Specifically, the coordinating unit 4 executes a filter process corresponding to the engine rotational number Ne to a signal corresponding to the input physical amount for setting the vibration-damping torque or a signal corresponding to the vibration-damping torque, thereby changing the vibration-damping torque. According to this, the vehicle vibration-damping controlling apparatus 1 can change the vibration-damping torque based on the engine rotational number Ne, that is to say, according to the relationship with the engine rotational number Ne.

The coordinating unit 4 executes a predetermined filter process corresponding to the engine rotational number Ne under a predetermined condition to the signal corresponding to the input physical amount for setting the vibration-damping torque, herein the input signal to the feedback controlling unit 3b. The coordinating unit 4 executes the predetermined filter process corresponding to the engine rotational number Ne under the predetermined condition to a signal corresponding to the average value r·ω of the wheel speed by using the average value r·ω of the wheel speed as the input physical amount for setting the vibration-damping torque.

The coordinating unit 4 of this embodiment includes a variable band cut filter (BCF) 4a, an engine state judging unit 4b and a switching unit 4c.

The signal corresponding to the average value no of the wheel speed is input to the variable BCF 4a, and this applies the predetermined filter process to the signal corresponding to the average value r·ω of the wheel speed to output. The filter process by the variable BCF 4a is the filter process to reject (cut) the frequency component (frequency band) corresponding to the variation of the engine rotational number Ne of the signal corresponding to the average value r·ω of the wheel speed. The variable BCF 4a here may be synchronized with the variation of the engine rotational number Ne input from the engine ECU 42 to make a rejection frequency (cut off frequency) variable. The variable BCF 4a is synchronized with the variation of the engine rotational number Ne to set the rejection frequency in the vicinity of the frequency of the engine rotational number Ne. The variable BCF 4a applies the filter process to reject a component in the vicinity of the frequency of the engine rotational number Ne based on the rejection frequency to the signal corresponding to the average value r·ω of the wheel speed to output.

Meanwhile, in general, the frequency band of the vibration-damping torque generally used in the sprung vibration-damping tends to be a relatively low frequency band as compared to the frequency band of the engine rotational number Ne, so that the coordinating unit 4 may use a low pass filter (LPF) and a high cut filter (HCF) fixedly set such that the rejection frequency is in a the relatively high frequency band corresponding to the frequency band of the engine rotational number Ne, for example, in place of the variable BCF 4a as the configuration to execute the above-described filter process.

The engine state judging unit 4b judges an operational state of the engine 22. The coordinating unit 4 executes the above-described filter process when the operational state of the engine 22 is under the predetermined condition based on a judgment result of the operational state of the engine 22 judged by the engine state judging unit 4b.

Detection signals of the various sensors indicating the state of the engine 22 and the like are input from the engine ECU 42 to the engine state judging unit 4b. The engine state judging unit 4b may judge whether the engine rotational number Ne is not lower than a predetermined rotational number set in advance (for example, a set idle rotational number), whether the engine 22 operates in a case of the vehicle 10 provided with the hybrid-type drive device 20, and whether the engine 22 is in the operational state other than self-sustained operation, for example. Herein, the state in which the engine 22 operates is intended to mean a state in which thermal energy generated by the combustion of the fuel in the combustion chamber of the engine 22 is output in a form of mechanical energy such as the torque. Also, the self-sustained operation of the engine 22 is intended to mean the operation performed when the final vibration-damping torque including the vibration-damping torque may be covered only by the output of the electric motor 23, and the operation with a small load with which accessories such as an air conditioner may be driven. The engine state judging unit 4b outputs the judgment result to the switching unit 4c and the switching unit 4c switches the input signal to the feedback controlling unit 3b based on the judgment result of the operational state of the engine 22.

The switching unit 4c can switch the input signal to the wheel torque estimating unit 3g to any one of a signal obtained by applying the filter process to the signal corresponding to the average value r·ω of the wheel speed and a signal to which the filter process is not applied according to the judgment result of the operational state of the engine 22 input from the engine state judging unit 4b.

The switching unit 4c sets a connection state such that the signal to which the filter process is applied is input to the wheel torque estimating unit 3g when it is judged that the engine rotational number Ne is not lower than the predetermined rotational number (set idle rotational number), the engine 22 operates and the engine 22 is in the operational state other than the self-sustained operation by the engine state judging unit 4b, for example. On the other hand, the switching unit 4c sets the connection state such that the signal to which the filter process is not applied is input to the wheel torque estimating unit 3g when it is judged that the engine rotational number Ne is smaller than the predetermined rotational number (set idle rotational number), or when it is judged that the engine 22 does not operate, or when it is judged that the engine 22 is in the self-sustained operational state by the engine state judging unit 4b, for example.

Therefore, in the vehicle vibration-damping controlling unit 3, when the operational state of the engine 22 is the operational state in which the accidental fire judging control is necessary, the signal corresponding to the average value r·ω of the wheel speed to which the filter process is applied by the coordinating unit 4 to reject the component in the vicinity of the frequency of the engine rotational number Ne is input to the wheel torque estimating unit 3g. Then, in the vehicle vibration-damping controlling unit 3, the feedback controlling unit 3b sets the FB vibration-damping torque U·FB based on the signal corresponding to the average value r·ω of the wheel speed of which component in the vicinity of the frequency of the engine rotational number Ne is rejected to set the vibration-damping torque. According to this, the vehicle vibration-damping controlling unit 3 can limit the vibration-damping torque by the coordinating unit 4 when the frequency of the vibration-damping torque, which is the control amount periodically applied in the vibration-damping control, and the frequency of the engine rotational number Ne, which is the judgment target amount in the accidental fire judging control, might be equivalent to each other. That is to say, the vehicle vibration-damping controlling unit 3 can limit the vibration-damping torque when the relationship between the vibration-damping torque and the engine rotational number Ne might be the relationship to inhibit the accidental fire judging control. Therefore, the vehicle vibration-damping controlling apparatus 1 changes the vibration-damping torque, which is the control amount of the vibration-damping control, based on the engine rotational number Ne being the judgment target amount, which is used in the accidental fire judging control and might vary along with the execution of the vibration-damping control, so that this can allow the vibration-damping control to coordinate with the various pieces of judging control related to the power source 21 such as the accidental fire judging control and can appropriately execute the vibration-damping control.

That is to say, the vehicle vibration-damping controlling apparatus 1 can inhibit the judgment target amount applied in the various pieces of judging control such as the rotational variation amount of the output shaft 22a, for example, from changing along with the execution of the vibration-damping control when controlling the output of the power source 21 such as the engine 22 in order to suppress the sprung vibration by the vibration-damping control, thereby inhibiting an effect to the various pieces of judging control such as the accidental fire judging control. For example, the vehicle vibration-damping controlling apparatus 1 can inhibit the rotational variation amount from decreasing by the inhibition of the rotational variation (torque variation) of the output shaft 22a by the torque periodically applied in the vibration-damping control when the accidental fire occurs in one of the cylinders of the engine 22 and the rotational variation associated with this occurs, and as a result, this can inhibit a case in which the accidental fire cannot be detected even when the accidental fire occurs in the engine 22. On the other hand, for example, the vehicle vibration-damping controlling apparatus 1 can inhibit the rotational variation amount from increasing by promotion of the rotational variation (torque variation) of the output shaft 22a by the torque periodically applied in the vibration-damping control when the rotational variation does not occur in the engine 22, and as a result, this can inhibit a case in which the accidental fire is detected even when the accidental fire does not occur in the engine 22. As a result, the vehicle vibration-damping controlling apparatus 1 can appropriately execute the various pieces of judging control such as the accidental fire judging control and appropriately execute the vibration-damping control, thereby improving the steering stability of the driver, the driving quality of the passenger and the like, for example.

On the other hand, in the vehicle vibration-damping controlling unit 3, when the operational state of the engine 22 is the operational state in which the accidental fire judging control is not necessary, the signal to which the filter process is not applied by the coordinating unit 4 is input to the wheel torque estimating unit 3g. Then, in the vehicle vibration-damping controlling unit 3, the feedback controlling unit 3b sets the FB vibration-damping torque U·FB based on the signal corresponding to the average value r·ω of the wheel speed, which is not limited by the filter process, to set the vibration-damping torque. According to this, the vehicle vibration-damping controlling apparatus 1 can inhibit unnecessary limitation of the vibration-damping torque, which is the control amount of the vibration-damping control.

Meanwhile, the vehicle vibration-damping controlling unit 3 also can set the FB vibration-damping torque U·FB based on the rotational number (rotational speed) No of the rotating body of the drive system rotating along with the rotation of the wheels 30RL and 30RR, which are the drive wheels, such as the engine rotational number (rotational speed) Ne, the motor rotational number (rotational speed) Nm, the generator rotational number (rotational speed) Ng, the transmission rotational number (rotational speed) when this is provided with the transmission and the turbine rotational number (rotational speed) when this is provided with the torque converter as the actual measured values related to the vibration or the detection values by the various sensors such as the wheel torque sensor, the wheel six-component force transducer, a pitch/bound sensor, a G sensor and a sensor for detecting a compression amount of the suspension, thereby setting the vibration-damping torque, as described above. In this case, the coordinating unit 4 may execute a predetermined filter process corresponding to the engine rotational number Ne under a predetermined condition to the input signal to the feedback controlling unit 3b of the above-described various parameters or the various detection values as the input physical amount for setting the vibration-damping torque. Also, the coordinating unit 4 may execute the filter process according to the above-described engine rotational number Ne to a signal corresponding to the FB vibration-damping torque U·FB being an output signal from the feedback controlling unit 3b, the signal corresponding to the vibration-damping torque being an output signal from the adder 3i or a signal corresponding to the vibration-damping torque correction amount Tx being an output signal from the driving torque converting unit 3c.

Also, in the vehicle vibration-damping controlling apparatus 1, the vehicle vibration-damping controlling unit 3 may include a phase adjuster (not illustrated) of the frequency in the vicinity of sprung resonance, for example. In this case, the vehicle vibration-damping controlling apparatus 1 can inhibit occurrence of deterioration in vibration-damping performance such as phase delay by the phase adjuster of the coordinating unit 4 even when a phase of the vibration-damping torque might be shifted from an appropriate phase by applying the filter process to the signal corresponding to the average value r·ω of the wheel speed. That is to say, the vehicle vibration-damping controlling apparatus 1 can resolve phase shifting of the vibration-damping torque by the filter process by the coordinating unit 4 by the phase adjuster and can add the vibration-damping torque correction amount Tx to the driver requested torque Ta at an optimal timing, thereby performing the vibration-damping control at the optimal timing.

According to the vehicle vibration-damping controlling apparatus 1 according to the embodiment of the present invention described above, the vehicle vibration-damping controlling apparatus 1 for executing the vibration-damping control to control the power source 21 loaded on the vehicle 10 and suppress the sprung vibration of the vehicle 10 changes the vibration-damping torque, which is the control amount of the vibration-damping control, based on the judgment target amount, which is used in the judging control and might vary along with the execution of the vibration-damping control. Therefore, the vehicle vibration-damping controlling apparatus 1 changes the vibration-damping torque, which is the control amount of the vibration-damping control, based on the judgment target amount, which is used in the judging control, and might vary along with the execution of the vibration-damping control, herein, the engine rotational number Ne, so that this can allow the vibration-damping control to coordinate with the various pieces of judging control related to the power source 21, thereby appropriately executing the vibration-damping control.

According to the vehicle vibration-damping controlling apparatus 1 according to the embodiment of the present invention described above, the vehicle vibration-damping controlling apparatus 1 for executing the vibration-damping control to control the power source 21 loaded on the vehicle 10 and suppress the sprung vibration of the vehicle 10 limits the vibration-damping torque when the frequency of the vibration-damping torque, which is the control amount of the vibration-damping control, and the frequency of the engine rotational number (rotational speed) of the output shaft 22a of the engine 22, which composes the power source 21, might be equivalent to each other. Therefore, since the vehicle vibration-damping controlling apparatus 1 limits the vibration-damping torque when the frequency of the vibration-damping torque and the frequency of the engine rotational number (rotational speed) might be equivalent to each other, this can allow the vibration-damping control to coordinate with the various pieces of judging control related to the power source 21, thereby appropriately executing the vibration-damping control.

Further, the vehicle vibration-damping controlling apparatus 1 according to the embodiment of the present invention described above sets the vibration-damping torque, which is the control amount, based on the rotational speeds of the wheels 30FL, 30FR, 30RL and 30RR of the vehicle 10. Therefore, the vehicle vibration-damping controlling apparatus 1 can change the vibration-damping torque according to the relationship with the judgment target amount by changing the rotational speed of the wheel 30i according to the relationship between the rotational speed of the wheel 30i and the engine rotational number Ne being the judgment target amount or by changing the vibration-damping torque.

Second Embodiment

Figure 6:
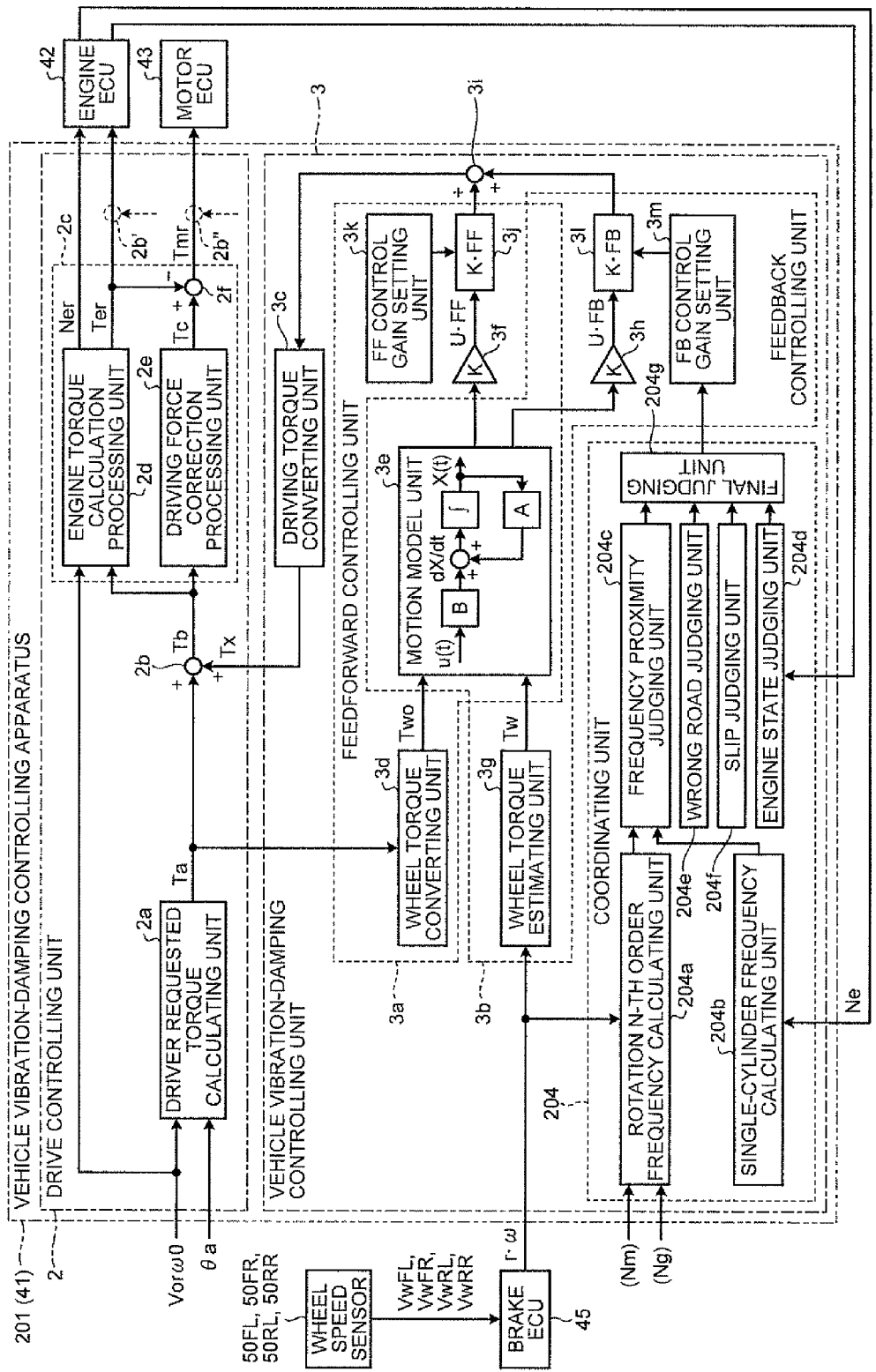
FIG. 6 is a schematic diagram illustrating a functional configuration example of the vehicle vibration-damping controlling apparatus according to a second embodiment in a form of a control block.

FIG. 6 is a schematic diagram illustrating a functional configuration example of the vehicle vibration-damping controlling apparatus according to a second embodiment in a form of the control block. A configuration of the coordinating unit of the vehicle vibration-damping controlling apparatus according to the second embodiment is different from that of the vehicle vibration-damping controlling apparatus according to the first embodiment. As for the configuration, the action and the effect common to those of the above-described embodiment, the description is not repeated as far as possible and the same numerals are given.

A vehicle vibration-damping controlling apparatus 201 according to this embodiment is provided with a coordinating unit 204 in the vehicle vibration-damping controlling unit 3 as a configuration to change the vibration-damping torque based on the judgment target amount, as illustrated in FIG. 6.

The coordinating unit 204 of this embodiment executes a process to change the control gain in the vibration-damping control according to the engine rotational number Ne. Then, the vehicle vibration-damping controlling unit 3 changes the vibration-damping torque by multiplying the control gain corresponding to the engine rotational number Ne by the vibration-damping torque being the control amount or the physical amount corresponding to the vibration-damping torque. According to this, the vehicle vibration-damping controlling unit 3 can change the vibration-damping torque based on the engine rotational number Ne, that is to say, according to the relationship with the engine rotational number Ne. The coordinating unit 204 executes a predetermined process corresponding to the engine rotational number Ne to the control gain under a predetermined condition in which it may be predicted that the vibration-damping torque affects the various pieces of judging control using the engine rotational number Ne, thereby limiting the vibration-damping torque.

Herein, the coordinating unit 204 controls the FB control gain setting unit 3m to set the FB control gain K·FB according to the engine rotational number Ne. According to this, the vehicle vibration-damping controlling unit 3 decreases the FB control gain K·FB and decreases the FB vibration-damping torque U·FB, which is the physical amount corresponding to the vibration-damping torque, under the predetermined condition in which it may be predicted that the vibration-damping control affects the various pieces of judging control, thereby finally decreasing the vibration-damping torque, in other words, limiting the same.

The coordinating unit 204 includes a rotation N-th order frequency calculating unit 204a, a single-cylinder frequency calculating unit 204b, a frequency proximity judging unit 204c, an engine state judging unit 204d, a wrong road judging unit 204e, a slip judging unit 204f and a final judging unit 204g.

The average value r·ω of the wheel speed (or the vehicle speed) is input to the rotation N-th order frequency calculating unit 204a, and this calculates the frequency components from rotation first order to N-th order based on the average value r·ω of the wheel speed to output a calculation result to the frequency proximity judging unit 204c. The engine rotational number Ne is input to the single-cylinder frequency calculating unit 204b and this calculates an engine single-cylinder frequency component to output a calculation result to the frequency proximity judging unit 204c. The frequency proximity judging unit 204c compares the rotation N-th order frequency input from the rotation N-th order frequency calculating unit 204a with the engine single-cylinder frequency input from the single-cylinder frequency calculating unit 204b and judges whether the rotation N-th order frequency and the engine single-cylinder frequency are adjacent to each other, that is to say, whether the rotation N-th order frequency and the engine single-cylinder frequency are equivalent to each other, thereby outputting a judgment result to the final judging unit 204g.

For example, when N=2, the wheel radius r is 0.3 m and the vehicle speed is approximately 100 km/h, since 100/(3.6·2·π·0.3)≈15, the calculation result of the rotation N-th order frequency≈15 Hz, 30 Hz. Herein, when the engine 22 is a four-cylinder engine and the engine rotational number Ne is approximately 1800 rpm, for example, since 1800/(60·2)≈15, the calculation result of the engine single-cylinder frequency≈15 Hz. Therefore, in this case, the frequency proximity judging unit 204c can judge that the rotation N-th order frequency and the engine single-cylinder frequency are adjacent to each other, that is to say, the rotation N-th order frequency and the engine single-cylinder frequency are equivalent to each other.

The engine state judging unit 204d has a configuration substantially similar to that of the above-described engine state judging unit 4b and outputs a judgment result of the operational state of the engine 22 to the final judging unit 204g. The wrong road judging unit 204e judges whether the vehicle 10 is traveling on a wrong road (including a case in which the irregularity of the road surface is larger, the road surface has a step and the like) by various known methods based on a differential value of the wheel speed (wheel acceleration) or sprung acceleration of the vehicle 10, for example, to output a judgment result to the final judging unit 204g. The slip judging unit 204f calculates a slip amount (slip ratio) being a scale of a state of the slip (magnitude of the slip) between the wheel 30i and the road surface by the various known methods based on the wheel speed and the vehicle speed, for example, to judge whether the slip amount is not smaller than an allowable amount set in advance and outputs a judgment result to the final judging unit 204g. In general, when the vehicle 10 is traveling on the wrong road or when the slip amount of the vehicle 10 is large, the frequency band of the vibration-damping torque used in the sprung vibration-damping tends to be a relatively high frequency band and this tends to be equivalent to the frequency band of the engine rotational number Ne. Therefore, the vehicle vibration-damping controlling apparatus 201 limits the vibration-damping torque when the wrong road judging unit 204e detects the wrong road travel of the vehicle 10, or when the slip judging unit 204f judges that the slip amount of the vehicle 10 is not smaller than the allowable amount set in advance as the case in which it can be predicted that the vibration-damping control might affect the various pieces of judging control.

The final judging unit 204g finally judges whether it is possible to predict that the vibration-damping control affects the various pieces of judging control based on the judgment result of the frequency by the frequency proximity judging unit 204c, the judgment result of the engine state by the engine state judging unit 204d, the judgment result of the wrong road travel of the vehicle 10 by the wrong road judging unit 204e and the judgment result of the state of the slip of the vehicle 10 by the slip judging unit 204f.

The final judging unit 204g judges that it can be predicted that the vibration-damping control affects the various pieces of judging control when the engine state judging unit 204d judges that the engine 22 operates and that the engine 22 is in the operational state other than the self-sustained operation and when the frequency proximity judging unit 204c judges that the rotation N-th order frequency and the engine single-cylinder frequency are equivalent to each other, or when the wrong road judging unit 204e detects the wrong road travel of the vehicle 10, or when the slip judging unit 204f judges that the slip amount of the vehicle 10 is not smaller than the allowable amount, for example.

When the final judging unit 204g judges that it can be predicted that the vibration-damping control affects the various pieces of judging control, this outputs a judgment result to the FB control gain setting unit 3m to decrease the FB control gain K·FB. As a result, the vehicle vibration-damping controlling unit 3 finally decreases the vibration-damping torque being the control amount of the vibration-damping control, in other words, limits the vibration-damping torque. According to this, the vehicle vibration-damping controlling unit 3 can limit the vibration-damping torque by the coordinating unit 204 when it may be predicted that the vibration-damping control affects the various pieces of judging control such as when the frequency of the vibration-damping torque and the frequency of the engine rotational number Ne might be equivalent to each other, or in a case of the operational state in which the frequency band of the vibration-damping torque used in the sprung vibration-damping tends to be the relatively high frequency band.

Meanwhile, herein, it may be configured such that the motor rotational number Nm and the generator rotational number Ng or the rotational number No of the rotating body are input to the rotation N-th order frequency calculating unit 204a in addition to the average value r·ω of the wheel speed (or the vehicle speed) and this calculates the rotation N-th order frequency thereof, and the frequency proximity judging unit 204c can be configured to judge whether the rotation N-th order frequency and the engine single-cylinder frequency are adjacent to each other using also the calculation result of the rotation N-th order frequency. For example, when N=2 and the motor rotational number Nm is 900 rpm, since 900/60≈15, the calculation result of the rotation N-th order frequency by the rotation N-th order frequency calculating unit 204a≈15 Hz. Therefore, the frequency proximity judging unit 204c can judge that the rotation N-th order frequency of the motor rotational number Nm and the engine single-cylinder frequency are adjacent to each other, that is to say, the rotation N-th order frequency of the motor rotational number Nm and the engine single-cylinder frequency are equivalent to each other. In this case, the coordinating unit 204 can predict whether the vibration-damping control affects the various pieces of judging control more correctly.

The vehicle vibration-damping controlling apparatus 201 according to the embodiment of the present invention described above changes the vibration-damping torque by multiplying the control gain (FB control gain K·FB) corresponding to the judgment target amount (engine rotational number Ne) by the vibration-damping torque being the control amount or the physical amount (FB vibration-damping torque U·FB) corresponding of the vibration-damping torque. Therefore, the vehicle vibration-damping controlling apparatus 201 can change the vibration-damping torque based on the engine rotational number Ne being the judgment target amount, that is to say, according to the relationship with the engine rotational number Ne being the judgment target amount.

Third Embodiment

FIG. 7 is a schematic diagram illustrating a functional configuration example of the vehicle vibration-damping controlling apparatus according to a third embodiment in a form of the control block. A configuration of the coordinating unit of the vehicle vibration-damping controlling apparatus according to the third embodiment is different from that of the vehicle vibration-damping controlling apparatus according to the first and second embodiments. As for the configuration, the action and the effect common to those of the above-described embodiments, the description is not repeated as far as possible and the same numerals are given.

A vehicle vibration-damping controlling apparatus 301 according to this embodiment is provided with a coordinating unit 304 in the vehicle vibration-damping controlling unit 3 as a configuration to change the vibration-damping torque based on the judgment target amount, as illustrated in FIG. 7. The coordinating unit 304 executes the process to change the control gain according to the engine rotational number Ne as the coordinating unit 204.

The coordinating unit 304 of this embodiment executes a predetermined analysis process to the signal corresponding to the input physical amount for setting the vibration-damping torque or the signal corresponding to the vibration-damping torque. The coordinating unit 304 executes the predetermined process corresponding to the engine rotational number Ne to the control gain when an output waveform of the signal corresponding to the above-described input physical amount or the signal corresponding to the vibration-damping torque is similar to a waveform of the rotational variation of the engine rotational number Ne according to relationship between an analysis result and the engine rotational number Ne, thereby limiting the vibration-damping torque.

The coordinating unit 304 of this embodiment includes an analyzing unit 304a, an effect judging unit 304b, an engine state judging unit 304c and a final judging unit 304d.

The signal corresponding to the vibration-damping torque and the signal corresponding to the input physical amount for setting the vibration-damping torque, herein the average value r·ω of the wheel speed are input to the analyzing unit 304a, and this performs frequency analysis and amplitude analysis to the output waveforms thereof and outputs an analysis result to the effect judging unit 304b. The analyzing unit 304a may perform the frequency analysis and the amplitude analysis by applying fast Fourier transform (FFT) to the above-described input signals, for example, or may estimate the frequency based on amplitude and cycle (period) for each zero-cross point of the above-described input signal, for example.

The effect judging unit 304b judges whether the vibration-damping control affects the various pieces of judging control based on the frequency and amplitude of the input signals (the signal corresponding to the average value r·ω of the wheel speed and the signal corresponding to the vibration-damping torque) analyzed by the analyzing unit 304a.

Specifically, the engine rotational number Ne is input to the effect judging unit 304b, and this calculates an engine single-cylinder frequency component, and judges whether the engine single-cylinder frequency and the frequency of the signal corresponding to the average value r·ω of the wheel speed or the signal corresponding to the vibration-damping torque analyzed above are equivalent to each other. Also, the effect judging unit 304b judges whether the amplitude of the signal corresponding to the average value r·ω of the wheel speed or of the signal corresponding to the vibration-damping torque is larger than predetermined amplitude set in advance. Herein, the predetermined amplitude set in advance may be set to amplitude, which is never generated by normal sprung vibration-damping control and might affect the various pieces of judging control, based on a result of an experiment and simulation performed in advance, for example. The effect judging unit 304b judges that the vibration-damping control affects the various pieces of judging control when this judges that the engine single-cylinder frequency and the frequency of the signal corresponding to the average value r·ω of the wheel speed or of the signal corresponding to the vibration-damping torque analyzed above are equivalent to each other, or when this judges that the amplitude of the signal corresponding to the average value r·ω of the wheel speed or of the signal corresponding to the vibration-damping torque analyzed becomes larger than the predetermined amplitude set in advance, and outputs a judgment result to the final judging unit 304d.

The engine state judging unit 304c has the configuration substantially similar to that of the above-described engine state judging unit 4b, and outputs a judgment result of the operational state of the engine 22 to the final judging unit 304d.

The final judging unit 304d judges that the vibration-damping control affects the various pieces of judging control when it is judged that the engine 22 operates and the engine 22 is in the operational state other than the self-sustained operation by the engine state judging unit 304c, and when it is judged that the engine single-cylinder frequency and the frequency of the signal corresponding to the average value r·ω of the wheel speed or of the signal corresponding to the vibration-damping torque analyzed above are equivalent to each other by the effect judging unit 304b, or when it is judged that the amplitude of the signal corresponding to the average value r·ω of the wheel speed or of the signal corresponding to the vibration-damping torque analyzed is larger than the predetermined amplitude set in advance, for example.

When the final judging unit 304d judges that the vibration-damping control affects the various pieces of judging control, this outputs a judgment result to the FB control gain setting unit 3m to decrease the FB control gain K·FB. As a result, the vehicle vibration-damping controlling unit 3 finally decreases the vibration-damping torque being the control amount of the vibration-damping control, in other words, limits the vibration-damping torque. According to this, the vehicle vibration-damping controlling unit 3 can limit the vibration-damping torque by the coordinating unit 304 when the vibration-damping control affects the various pieces of judging control such as when the frequency of the vibration-damping torque and the frequency of the engine rotational number Ne might be equivalent to each other and when the amplitude of the vibration-damping torque is never generated by the normal sprung vibration-damping control and might become the amplitude, which might affect the various pieces of judging control.

Meanwhile, herein, it is possible to configure such that signals corresponding to the motor rotational number Nm, the generator rotational number Ng or the rotational number No of the rotating body and the detection values by the various sensors such as the pitch/bound sensor, the G sensor and the sensor for detecting the compression amount of the suspension as the actual measured values related to the vibration in addition to the signal corresponding to the average value r·ω of the wheel speed (or the vehicle speed) and the signal corresponding to the vibration-damping torque are input to the analyzing unit 304a and this executes the predetermined analysis process to the output waveforms thereof, and the effect judging unit 304b may be configured to judge also by using the analysis result of the output waveforms. In this case, the coordinating unit 304 can judge whether the vibration-damping control affects the various pieces of judging control more correctly.

The vehicle vibration-damping controlling apparatus 301 according to the embodiment of the present invention described above limits the vibration-damping torque when the amplitude of the vibration-damping torque, which is the control amount of the vibration-damping control, might be larger than the predetermined amplitude set in advance. Therefore, the vehicle vibration-damping controlling apparatus 301 can allow the vibration-damping control to coordinate with the various pieces of judging control related to the power source 21 more certainly, thereby appropriately executing the vibration-damping control.

Meanwhile, the above-described vehicle vibration-damping controlling apparatus according to the embodiments of the present invention is not limited to the above-described embodiments and various changes are possible without departing from the scope of claims. The vehicle vibration-damping controlling apparatus described above may be the one adopting the motion model other than the above-described one or may perform the vibration-damping by a controlling method other than the optimal regulator. Also, the vehicle vibration-damping controlling apparatus described above may perform the power control based on automatic travel requested torque calculated when performing the control of the power source 21 in automatic travel control by an automatic travel control device. Also, the vehicle vibration-damping controlling apparatus described above may have a configuration to suppress the sprung vibration due to the change in the wheel torque occurring in the vehicle 10 by brake operation or steering operation by the driver.

Also, the above-described vehicle vibration-damping controlling apparatus may limit the vibration-damping torque by providing upper and lower limit guard to the FB vibration-damping torque U·FB, the vibration-damping torque or the vibration-damping torque correction amount Tx according to the engine rotational number Ne or by inhibiting the vibration-damping control itself (making the vibration-damping torque correction amount Tx=0), for example. Also, the above-described vehicle vibration-damping controlling apparatus may be configured to change the control amount of the vibration-damping control based on an output variation amount of the electric motor when performing the various pieces of judgment by using the output variation amount of the electric motor as the power source as the judgment target amount, which might vary along with the execution of the vibration-damping control, for example. In this case, it is not necessary to provide a judgment condition such as whether the engine 22 operates and whether the engine 22 is in the operational state other than the self-sustained operation by the above-described engine state judging unit 4b. Also, the judgment target amount and the judging control judged based on the judgment target amount, which might vary along with the execution of the vibration-damping control, are not limited to the above-described one in the above-described vehicle vibration-damping controlling apparatus. Also, the vibration-damping torque correction amount Tx may be put in the requested torque for the power source 21 in an adder 2b' on a subsequent stage of the engine torque calculation processing unit 2d and an adder 2b" on a subsequent stage of the subtracter 2f depending on the operational state, as illustrated in FIGS. 2, 6 and 7.

INDUSTRIAL APPLICABILITY

As described above, the vehicle vibration-damping controlling apparatus according to the present invention is suitable to be used in the various vehicle vibration-damping controlling apparatuses for controlling the power source loaded on the vehicle to suppress the sprung vibration of the vehicle.

Reference Signs List

| | |
|---|---|
| 1, 201, 301 | VEHICLE VIBRATION-DAMPING CONTROLLING APPARATUS |
| 2 | DRIVE CONTROLLING UNIT |
| 3 | VEHICLE VIBRATION-DAMPING CONTROLLING UNIT |
| 4, 204, 304 | COORDINATING UNIT |
| 10 | VEHICLE |
| 20 | DRIVING DEVICE |
| 21 | POWER SOURCE |
| 22 | ENGINE |
| 22a | OUTPUT SHAFT |
| 23 | ELECTRIC MOTOR |
| 23a, 24a | DRIVE SHAFT |

The invention claimed is:

1. A vehicle vibration-damping controlling apparatus comprising:
a power source loaded on a vehicle;
a vehicle vibration-damping controlling unit configured to control the power source and execute vibration-damping control to suppress sprung vibration of the vehicle; and
a coordinating unit configured to change a control amount of the vibration-damping control based on a judgment target amount that is used in judging control and is variable along with an output control of the power source accompanied by an execution of the vibration-damping control,
wherein the coordinating unit changes the control amount of the vibration-damping control according to a relationship between the control amount of the vibration-damping control and the judgment target amount so as to inhibit a variation of the judgment target amount and to inhibit affecting the judging control, when an operational state of the power source is an operational state in which the judging control is necessary and when the relationship is a relationship that inhibits the judging control, the judging control monitoring rotational variation of an output shaft, and the control amount being a vibration-damping torque and the judgment target amount being an engine rotational speed.

2. The vehicle vibration-damping controlling apparatus according to claim 1, further comprising:
a judging unit configured to judge whether the vibration-damping control affects various pieces of judging control.

3. The vehicle vibration-damping controlling apparatus according to claim 1, wherein the coordinating unit limits the control amount when a frequency of the control amount and a frequency of the judgment target amount are equivalent to each other.

4. The vehicle vibration-damping controlling apparatus according to claim 1, wherein the coordinating unit sets the control amount when an amplitude of the control amount is larger than a predetermined amplitude set in advance.

5. The vehicle vibration-damping controlling apparatus according to claim 1, wherein the coordinating unit sets the control amount based on a rotational speed of a wheel of the vehicle.

6. The vehicle vibration-damping controlling apparatus according to claim 1, wherein:
the power source includes at least an internal-combustion engine;
the judgment target amount is a rotational variation amount of an output shaft of the internal-combustion engine; and
the judging control is a control to judge accidental fire of the internal-combustion engine based on the rotational variation amount.

7. The vehicle vibration-damping controlling apparatus according to claim 1, wherein the coordinating unit changes the control amount by executing a filter process corresponding to the judgment target amount to a signal corresponding to an input physical amount for setting the control amount or to a signal corresponding to the control amount.

8. The vehicle vibration-damping controlling apparatus according to claim 1, wherein the coordinating unit changes the control amount by multiplying a control gain corresponding to the judgment target amount by the control amount or a physical amount corresponding to the control amount.

9. A vehicle vibration-damping controlling apparatus comprising:
   a power source loaded on a vehicle;
   a vehicle vibration-damping controlling unit configured to control the power source and execute vibration-damping control to suppress sprung vibration of the vehicle; and
   a coordinating unit configured to change a control amount of the vibration-damping control based on a judgment target amount that is used in judging control and is variable along with an output control of the power source accompanied by an execution of the vibration-damping control,
   wherein the coordinating unit limits a control amount of the vibration-damping control when a frequency of the control amount of the vibration-damping control so as to inhibit a variation of the judgment target amount and to inhibit affecting the judging control, and a frequency of a rotational speed of an output shaft, which is the judgment target amount, of an internal-combustion engine composing the power source are equivalent to each other, when an operational state of the power source is an operational state in which the judging control is necessary and when a relationship between the control amount of the vibration-damping control and the judgment target amount is a relationship that inhibits the judging control, the judging control monitoring rotational variation of an output shaft, and the control amount being a vibration-damping torque and the judgment target amount being an engine rotational speed.

10. The vehicle vibration-damping controlling apparatus according to claim 9, further comprising:
   a judging unit configured to judge whether the vibration-damping control affects various pieces of judging control.

* * * * *